United States Patent [19]

Kees, Jr. et al.

[11] 4,018,412

[45] Apr. 19, 1977

[54] BRACKET FOR AN OPERATING TABLE

[75] Inventors: George Kees, Jr., Alexandria, Ky.; Horst R. Hickmann, Anderson Township, Hamilton County, Ohio

[73] Assignee: Kees Surgical Specialty Company, Cincinnati, Ohio

[22] Filed: Oct. 14, 1975

[21] Appl. No.: 622,362

[52] U.S. Cl. .............................. 248/214; 24/248 A; 24/248 E; 248/286

[51] Int. Cl.$^2$ ...................... A01B 15/00; F16B 1/00

[58] Field of Search .......... 248/214, 286, 287, 279, 248/298; 24/263 CA, 248 A, 248 E; 5/317 C

[56] References Cited

UNITED STATES PATENTS

| | | | |
|---|---|---|---|
| 837,642 | 12/1906 | Powell | 248/286 X |
| 974,637 | 11/1910 | Borup | 24/248 E UX |
| 1,704,979 | 3/1929 | Kusterle | 248/286 X |
| 2,422,865 | 6/1947 | Tucker | 24/248 E UX |
| 2,613,052 | 10/1952 | Sellars | 248/214 |
| 2,642,250 | 6/1953 | Kasnowich | 248/214 X |
| 2,711,300 | 6/1955 | Nelson | 248/214 |
| 2,749,196 | 6/1956 | Wolfe | 248/214 |
| 3,696,653 | 10/1972 | Mojelski | 24/248 E X |

*Primary Examiner*—J. Franklin Foss
*Attorney, Agent, or Firm*—James W. Pearce; Roy F. Schaeperklaus

[57] ABSTRACT

An operating table bracket which includes a body having a face which overlies an upper edge of a support bar of the operating table and a locking member mounted for swinging movement and for up and down movement with relation to the body and for engaging an underside of the support bar. A cam operates the locking member. The locking member is mounted on a pivot which is slidable up and down with respect to the body. Initial operation of the cam swings the locking member from a released position to a bracket retaining position in which the locking member loosely engages the support bar but the bracket can be slid along the support bar. Further advance of the cam causes the locking member to rise against the underside of the support bar to lock the bracket on the support bar. An instrument holding means on the body includes a yoke member which is rotatably mounted on the body for swinging about a transverse axis and an instrument support releasably attached to the yoke member.

4 Claims, 10 Drawing Figures

BRACKET FOR AN OPERATING TABLE

This invention relates to a bracket for mounting an instrument support on a hospital operating table or the like.

Instruments required in connection with an operating table are ordinarily supported on a horizontal support bar which is attached to a side of the operating table and which extends along the side of the operating table spaced therefrom. An object of this invention is to provide a bracket which firmly, yet releasably, attaches an instrument support to an operating table support bar.

A further object of this invention is to provide such a bracket which can be slid along the operating table support bar and can be quickly and easily locked in position on the support bar.

A further object of this invention is to provide such a bracket which is actuated by swinging of a crank arm through a portion of an arc and in which the crank arm can be swung between a first position in which the bracket can be removed from the support bar, a second position in which the bracket can be slid along the support bar but is restrained against removal from the support bar and a third position in which the bracket is locked in position on the support bar.

A further object of this invention is to provide such a bracket which includes pivotally adjustable means for attaching the instrument support to the bracket.

Briefly, this invention provides an operating table bracket which includes a body having a portion which overlies an upper edge of a support bar of the operating table and a locking member mounted for swinging movement with relation to the body and for engaging an underside of the support bar. A cam operates the locking member. The locking member is mounted on a pivot which is slidable up and down with respect to the body. Initial operation of the cam swings the locking member from a released position to a bracket retaining position in which the locking member loosely engages the support bar but the bracket can be slid along the support bar. At this position, the locking member rests on the cam with a bar engaging face thereof substantially horizontal and underlying the support bar. Further advance of the cam causes the locking member to rise against the underside of the support bar to lock the bracket on the support bar. Means is provided on the bracket for releasably holding an instrument support.

The above and other objects and features of the invention will be apparent to those skilled in the art to which this invention pertains from the following detailed description and the drawings, in which.

In the following detailed description and the drawings, like reference characters indicate like parts.

Figure 1:
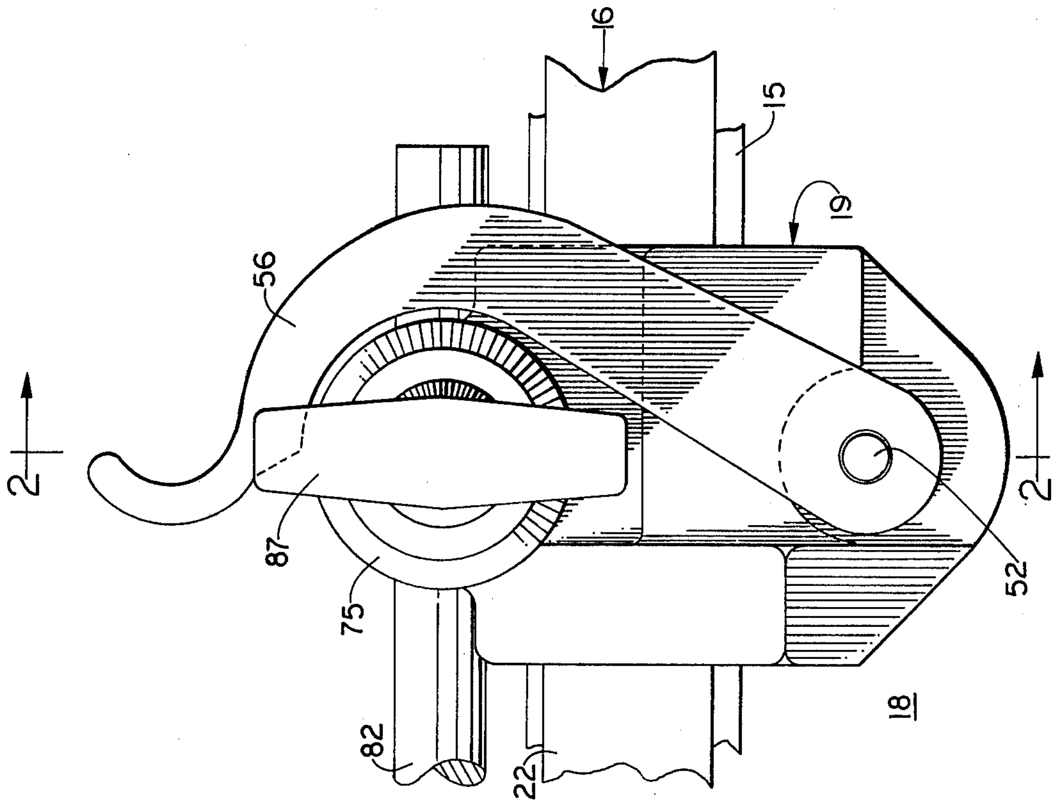
FIG. 1 is a view in front elevation of an operating table bracket constructed in accordance with an embodiment of this invention, fragmentary portions of a hospital operating table, a support bar of the operating table, and an instrument support being shown in association therewith.
Figure 2:
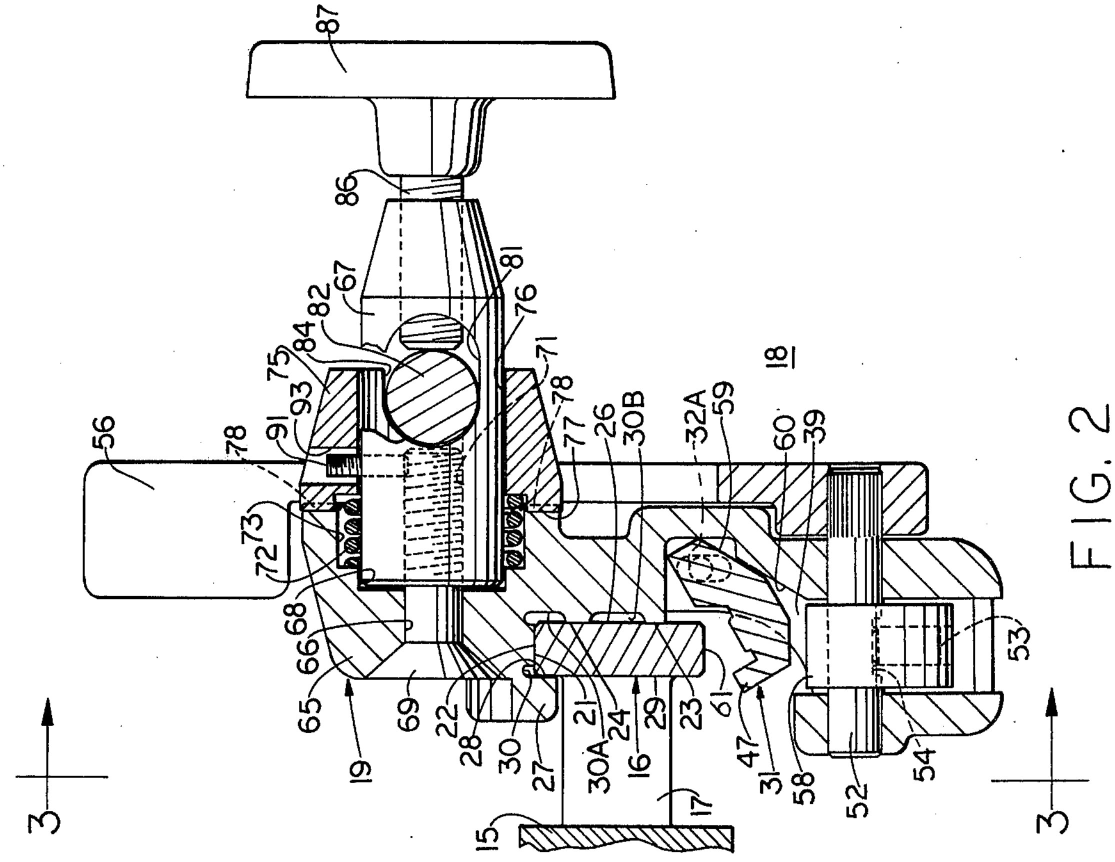
FIG. 2 is a view in section taken on the line 2—2 in FIG. 1, a locking member of the bracket being shown in released position, parts being broken away to reveal details of structure.

In FIGS. 1 and 2 is shown a fragmentary portion of a conventional operating table 15 along a side of which is mounted a support bar 16. As shown in FIG. 2, the support bar 16 is spaced from the operating table 15 and supported on the operating table 15 by suitable support arms, one of which is shown at 17.

An instrument supporting bracket 18, constructed in accordance with an embodiment of this invention, is mounted on the support bar 16. The bracket 18 includes a body 19. A downwardly directed support face 21 (FIG. 2) on the body 19 overlies and rests on an upper face 22 of the support bar 16. Upright faces 23 and 24 on the body 19 engage an outer face 26 of the support bar 16. A lip 27 on the body 19 includes an upright face 28 which engages an inner face 29 of the support bar 16. Appropriate relief areas 30, 30A and 30B can be formed between the faces 28, 21, 24 and 23.

The body 19 can be locked in position on the support bar 16 by a locking member 31. The locking member 31 is carried on coaxial pivot pins 32 and 32A which are mounted in lengthwise sockets 33 and 33A, respectively, (FIG 3) in the locking member 31. Free end portions 34 and 36 of the pivot pins 32 and 32A are received in upright slots 37 and 38 in upright flanges 39 and 41, respectively, of the body 19. The flanges 39 and 41 define a cavity 42 in which a hinge portion 43 of the locking member 31 moves. The locking member 31 includes a support bar engaging surface 44 (FIG. 4) and a cam engaging surface 46. The surfaces 44 and 46 are parallel. A lip 47 on the locking member 31 includes a surface 48 which extends perpendicularly to the surface 44 and which can engage the inner face 29 of the support bar 16.

Figure 7:
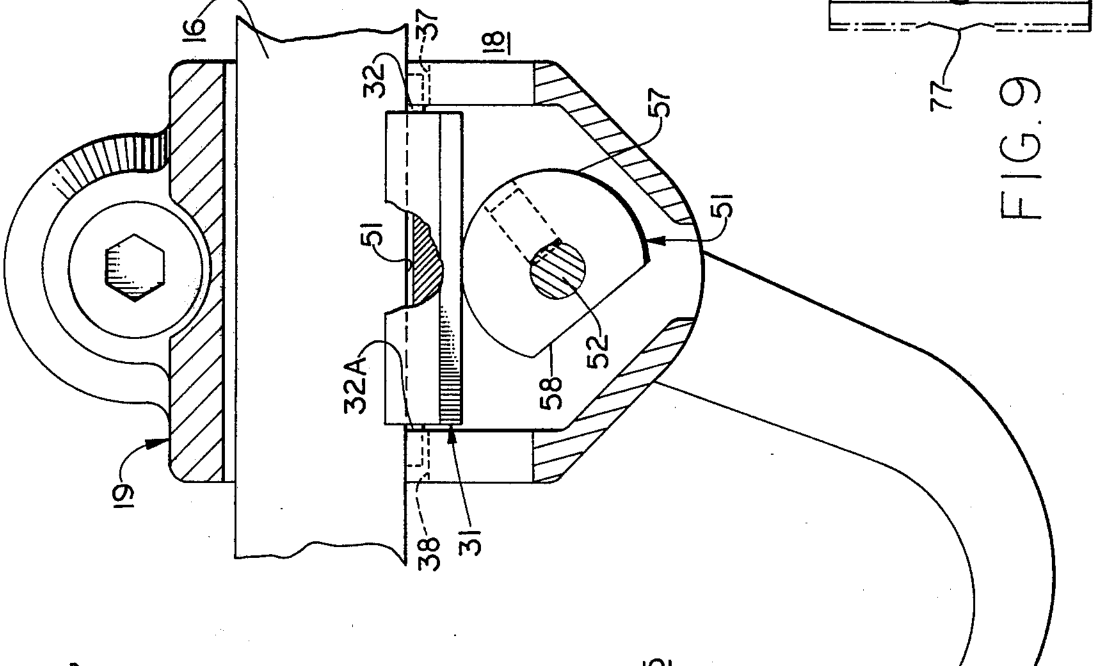
FIG. 7 is a view in section taken on the line 7—7 in FIG. 5, the locking member being shown partly broken away.

The locking member 31 is actuated by a cam 51, which is mounted on a shaft 52 rotatably mounted in the body 18. A set screw 53, which is mounted on the cam 51, engages a flat face 54 (FIG. 2) on the shaft 52 to cause the cam 51 to turn with the shaft 52. A handle 56 is mounted on the shaft 52 and is splined thereto. As shown in FIG. 7, the cam includes a cylindrical camming face 57, the axis of which is offset from the axis of the shaft 52, and a flat face 58 which is parallel to the axis of the shaft 52 and follows a chord of the cylindrical face.

Figure 3:
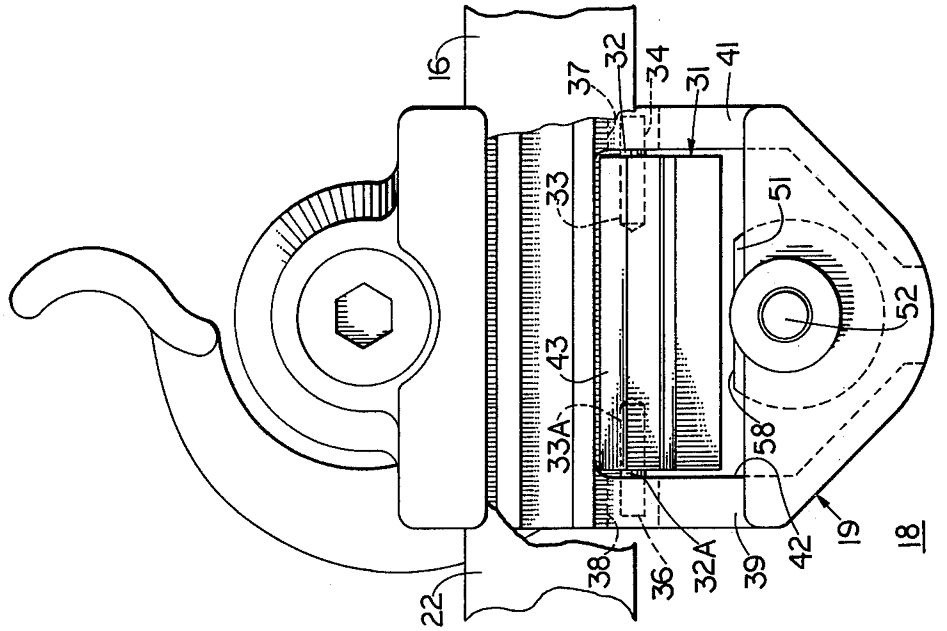
FIG. 3 is a view in rear elevation of the operating table bracket looking in the direction of the arrows 3—3 in FIG. 2, a fragmentary portion of an operating table support bar being shown in association therewith.
Figure 4:
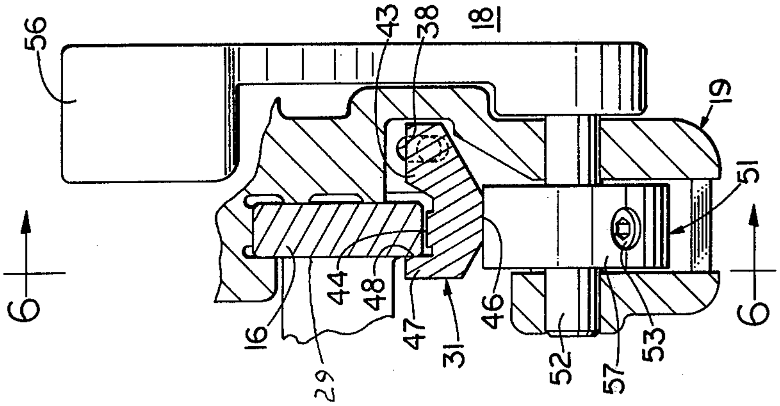
FIG. 4 is a fragmentary view in section taken on the same line as FIG. 2 but showing the locking member in an intermediate position.
Figure 5:
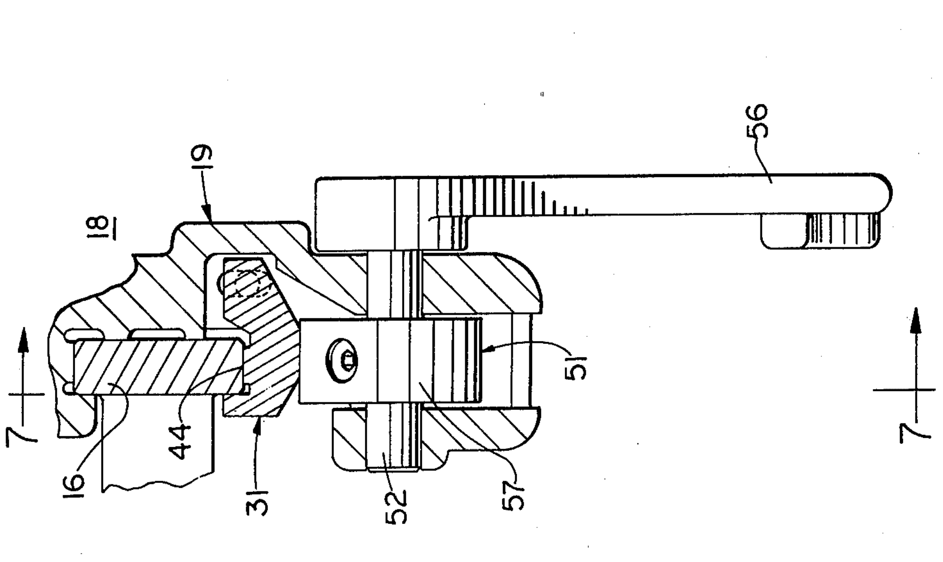
FIG. 5 is a fragmentary view in section taken on the same line as FIGS. 2 and 4 but showing the locking member in locked position.
Figure 6:
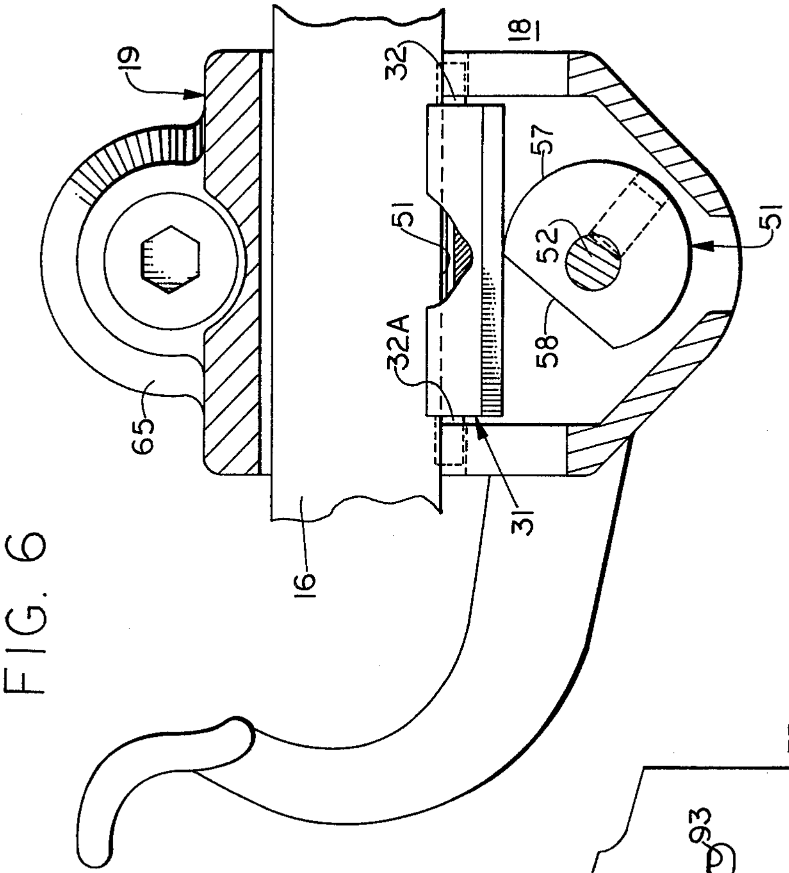
FIG. 6 is a view in section taken on the line 6—6 in FIG. 4, the locking member being shown partly broken away to reveal details of construction.
Figure 9:
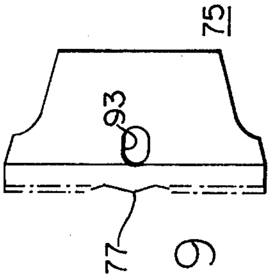
FIG. 9 is a plan view of the ratchet member shown in FIG. 8.

When the cam 51 is in a lowered or released position shown in FIGS. 2 and 3 with the flat face 58 underlying the locking member 31, the locking member 31 extends downwardly from the pivot pins 32 and 32A so that the lip 47 is free of the support bar 16, and the bracket 18 can be removed from or mounted on the support bar 16. A face 59 of the locking member 31 can engage a sloping face 60 of the body 18 to limit downward swinging of the locking member 31. As the handle 56 is swung to the position shown in FIGS. 4 and 6, the locking member 31 is raised by the cam 51 and swings upwardly until the cam engaging face 46 of the locking member 31 rests on the cylindrical camming face 57 of the cam 51. The camming face 57 is relatively broad, and a line of contact is formed between the cam engaging face 46 and the camming face 57 which substantially underlies the center of gravity of the locking member 31. As the cam 51 is further swung to the position shown in FIGS. 5 and 7, the locking member 31 is raised with the end portions of the pivot pins 32 and 32A coming free of lower ends of the slots 37 and 38, and the locking member 31 is advanced upwardly without substantial swinging about the pivot pins 32 and 32A and the pivot pins 32 and 32A act to stabilize the position of the locking member without restraining upward movement of the locking member 31. When the locking member 31 reaches the position shown in FIGS. 5 and 7, the support bar engaging surface 44 of the locking member 31 engages flatwise with a lower face 61 of the support bar 16, and the bracket 18 is locked firmly in position on the support bar 16. When the locking member 31 and the cam 51 are in the intermediate position shown in FIGS. 4 and 6, the bracket 18 can be slid along the support bar 16, but the locking member 31 prevents release of the bracket 18 from the support bar 16.

Figure 8:
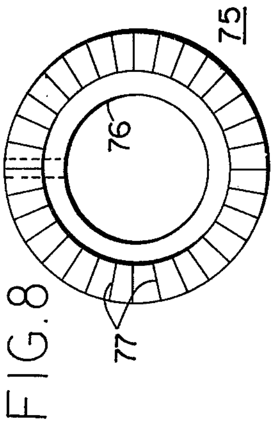
FIG. 8 is a view in end elevation of a ratchet member forming a part of the bracket.

In an upper portion 65 of the bracket body 19 is formed a doubly counterbored transverse bore 66 (FIG. 2). An elongated yoke member 67 is held with an end portion thereof in a counterbore 68 by a fastener 69, which is threaded in a lengthwise bore 71 in the yoke member 67. A compression spring 72 in a double counterbore 73 bears on a ratchet member 75 to urge the ratchet member 75 to the right with respect to the body 19 as shown in FIG. 2. The ratchet member 75 has a central bore 76 (FIG. 8) in which the yoke member 67 is received as shown in FIG. 2 so that the ratchet member 75 can advance to the right and left with respect to the yoke member 67. Teeth 77 (FIG. 8) on the ratchet member 75 are engageable with complementary teeth 78 (FIG. 2) on the body 19, not shown in detail, to prevent rotation of the ratchet member 75 with respect to the body 19 when the teeth are in the engaged position shown in FIG. 2.

Figure 10:
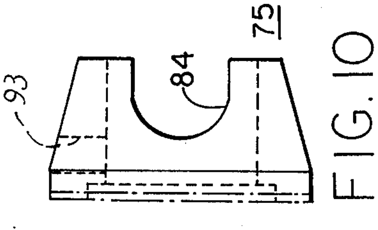
FIG. 10 is a view in side elevation of the ratchet member shown in FIGS. 8 and 9.

The yoke member 67 is provided with a transverse slot 81, which receives a rod 82 (only a portion of which is shown). The rod 82 can be a conventional support for an instrument or the like (not shown) which can be supported with relation to the support bar 16. The ratchet member 75 is provided with a transverse slot 84 (FIG. 10) which also receives the rod 82 as shown in FIG. 2. A screw fastener 86, which is threaded in the lengthwise bore 71 of the yoke member 67, releasably grips the rod 82. A handle 87 on the screw fastener 86 makes it possible to turn the screw fastener 86 in a tightening direction to cause the screw fastener 86 to engage the rod 82 and advance the rod 82 and the ratchet member 75 to the left as shown in FIG. 2 to cause the teeth 77 and 78 to engage. When the screw fastener is turned in an opposite direction, the compression spring 72 advances the ratchet member 75 to the right to permit release of the teeth 77 and 78. A set screw 91 radially mounted in the yoke member 67 engages the fastener 69 to prevent release of the yoke member 67 from the fastener 69. An upper end of the set screw 91 extends into a slot 93 in the ratchet member 75 to prevent turning of the ratchet member 75 with respect to the yoke member 67 and to keep the slot 84 of the ratchet member 75 in alignment with the slot 81 of the yoke member 67. However, the assembly of the fastener 69, the ratchet member 75, and the yoke member 67 can be turned with respect to the body 19 when the teeth 77 and 78 are released to permit swinging of the rod 84 with respect to the body 19.

The bracket for an operating table illustrated in the drawings and described above is subject to structural modification without departing from the spirit and scope of the appended claims.

Having described our invention, what we claim as new and desire to secure by letters patent is:

1. An instrument support bracket for an operating table which comprises a body having a downwardly directed support face for overlying an upper face of a support bar of the operating table, an upright face for engaging an upright outer face of the support bar, and a lip for engaging an inner upright face of the support bar, a locking clamp jaw member, said locking clamp jaw member having a locking face engageable with an underside of the support bar, a lip engageable with the inner upright face, and pivot pin means spaced from the lip and from the locking face, upright slot means in the body for guiding the pivot pin means for up and down movement, a cam pivotally mounted in the body under the locking clamp jaw member and engageable with the locking clamp jaw member, in the plane of the slot means being at right angles to the pivotal axis of the cam, and means for swinging the cam, the cam being arranged to swing the locking clamp jaw member between a lowered position in which the lip is free of the support bar and an intermediate position in which the lip of the locking clamp jaw member engages the support bar and the locking face underlies the lower face of the support bar in opposed relation thereto when the cam is swung in a locking direction, further swinging of the cam in locking direction advancing the locking clamp jaw member into locking engagement with the underside of the support bar.

2. An instrument support bracket as in claim 1 wherein the cam has a partially cylindrical face and the locking clamp jaw member has a flat cam engaging face, the cam engaging face being parallel to and opposed to the locking face so that pressure of the partially cylindrical face of the cam against the cam engaging face causes pressure of the locking face against the lower face of the support bar.

3. An instrument support bracket in accordance with claim 1 wherein there is a transverse yoke member rotatably mounted in the body, means for attaching an instrument supporting rod to the transverse yoke, and means for locking the transverse yoke in selected positions on the body.

4. An instrument support bracket for an operating table which comprises a body having a downwardly directed support face for overlying an upper face of a support bar of the operating table, a locking clamp jaw member, said locking clamp jaw member having a locking face engageable with an underside of the support bar and having pivot pin means spaced from the locking face, upright slot means in the body for guiding the pivot pin means for up and down movement, a cam pivotally mounted in the body under the locking member and engageable with the locking member, the plane of the slot means being at right angles to the pivotal axis of the cam, means for swinging the cam, the cam being arranged to swing the locking clamp jaw member between a lowered position in which the locking clamp jaw member is free of the support bar and an intermediate position in which the locking face underlies the lower face of the support bar in opposed relation thereto when the cam is swung in a locking direction, further swinging of the cam in locking direction advancing the locking clamp jaw member into locking engagement with the underside of the support bar, a transverse yoke member rotatably mounted in the body, means for attaching an instrument supporting rod to the transverse yoke member, and means for locking the transverse yoke member in selected positions on the body.

* * * * *

UNITED STATES PATENT OFFICE
CERTIFICATE OF CORRECTION

Patent No. 4,018,412 Dated April 19, 1977

Inventor(s) George Kees, Jr. and Horst R. Hickmann

It is certified that error appears in the above-identified patent and that said Letters Patent are hereby corrected as shown below:

Column 4, line 34, delete the word "in".

Signed and Sealed this

*fifth* Day of *July 1977*

[SEAL]

*Attest:*

RUTH C. MASON
*Attesting Officer*

C. MARSHALL DANN
*Commissioner of Patents and Trademarks*